United States Patent
Daube et al.

(10) Patent No.: US 11,851,162 B1
(45) Date of Patent: Dec. 26, 2023

(54) UNMANNED AERIAL VEHICLE WITH CAPACITIVE SENSOR PROPELLER STOPPAGE

(71) Applicants: Nir Daube, Pacific Palisades, CA (US); Simon Nielsen, Beverly Hills, CA (US)

(72) Inventors: Nir Daube, Pacific Palisades, CA (US); Simon Nielsen, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 367 days.

(21) Appl. No.: 16/752,828

(22) Filed: Jan. 27, 2020

(51) Int. Cl.
| | | |
|---|---|---|
| B64C 19/00 | (2006.01) | |
| B64C 39/02 | (2023.01) | |
| B64C 27/20 | (2023.01) | |
| B64U 10/13 | (2023.01) | |
| B64U 30/20 | (2023.01) | |

(52) U.S. Cl.
CPC ............ *B64C 19/00* (2013.01); *B64C 39/024* (2013.01); *B64C 27/20* (2013.01); *B64U 10/13* (2023.01); *B64U 30/20* (2023.01)

(58) Field of Classification Search
None
See application file for complete search history.

(56) References Cited

U.S. PATENT DOCUMENTS

| | | | |
|---|---|---|---|
| 2016/0039529 A1* | 2/2016 | Buchmueller | B64C 11/00 244/65 |
| 2017/0160750 A1* | 6/2017 | Kimchi | G05D 1/101 |
| 2018/0059660 A1* | 3/2018 | Heatzig | G06V 20/10 |
| 2018/0111684 A1* | 4/2018 | Namgoong | B64C 39/024 |
| 2019/0009893 A1* | 1/2019 | Toyama | B64C 39/024 |
| 2019/0206266 A1* | 7/2019 | Taveira | B64C 39/024 |
| 2019/0217948 A1* | 7/2019 | Pounds | B64C 39/024 |
| 2019/0225327 A1* | 7/2019 | Kidakarn | B64C 39/024 |
| 2021/0001978 A1* | 1/2021 | Saunders | B64D 17/80 |

OTHER PUBLICATIONS

Schnoor et al., Texas Instruments: "Sensitivity, SNR, and design margin in capacitive touch applications", Mar. 2019, Texas Instruments, pp. 1-21 (Year: 2019).*
TI Designs, TI Designs: "Noise-Tolerant Capacitive-Touch Human-Machine Interfaces Design Guide", Jun. 2016, Texas Instruments, pp. 1-101 (Year: 2016).*

* cited by examiner

*Primary Examiner* — Jelani A Smith
*Assistant Examiner* — Davin Seol
(74) *Attorney, Agent, or Firm* — Culhane Meadows PLLC; Stephen J. Weed (57) ABSTRACT

Systems, devices, and methods for stopping the rotation of propellers used in unmanned aerial vehicles (UAV) such as drones are disclosed. The propellers are stopped in response to sensing human touch on a surface of the UAV using capacitive sensors.

17 Claims, 5 Drawing Sheets

UNMANNED AERIAL VEHICLE WITH CAPACITIVE SENSOR PROPELLER STOPPAGE

TECHNICAL FIELD

The present subject matter relates to safety features for unmanned aerial vehicles such as drones and, more specifically, to systems and methods for stopping propeller rotation in response to human touch.

BACKGROUND

Unmanned aerial vehicles (UAV) such as drones are aircraft without a human pilot aboard. The UAVs have propellers that rotate at a high rate of speed (e.g., 8000 RPM) to create the lift necessary to fly. Touching a propeller during operation can cause injury and/or damage the UAV. Conventional UAVs use propeller guards to protect the public and the propellers.

BRIEF DESCRIPTION OF THE DRAWINGS

The drawing figures depict non-limit examples. In the figures, like reference numerals refer to the same or similar elements. When more than one of the same or similar elements are depicted, a common reference number may be used with a letter designation corresponding to a respective element. When the elements are referred to collectively or a non-specific element is referenced, the letter designation may be omitted. In the drawings.

DETAILED DESCRIPTION

In an example, a UAV includes propeller guards at least partially surrounding propellers. The propeller guards are attached to a main body of the UAV, which supports components of the UAV such as propeller assemblies that include the propellers and motors for rotating the propellers. Capacitive sensors are positioned on exterior surfaces of the UAV such as on the main body and on the propeller guards. When human touch on an exterior surface of the UAV is detected, the propellers are stopped to prevent injury to the human and damage to the propeller assembly. Stopping the propellers responsive to capacitive touch allows for the use of lighter and more open propeller guards, e.g., guards with bigger holes that allow more efficient airflow, thereby improving efficiency, weight, and noise.

In the following description, numerous specific details are set forth by way of examples in order to provide a thorough understanding of the relevant teachings. How to practice the present teachings, however, should be apparent to those skilled in the art without the need for such details. In other instances, well-known methods, procedures, components, and circuitry are described at a relatively high-level, without detail, in order to avoid unnecessarily obscuring aspects of the present teachings.

The term "coupled" as used herein refers to any logical, optical, physical or electrical connection, link or the like by which electrical signals produced or supplied by one system element are imparted to another coupled element. Unless described otherwise, coupled elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the UAV, associated components and any complete devices, are given by way of example only, for illustration and discussion purposes. In operation, for particular programming, the UAV may be oriented in any other direction suitable to the particular application of the UAV, for example up, down, sideways, or any other orientation. Also, to the extent used herein, any directional term, such as front, rear, inward, outward, towards, left, right, lateral, longitudinal, up, down, upper, lower, top, bottom and side, are used by way of example only, and are not limiting as to direction or orientation of any UAV or component of a UAV constructed as otherwise described herein.

Objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to examples illustrated in the accompanying drawings and discussed below.

Figure 1A:
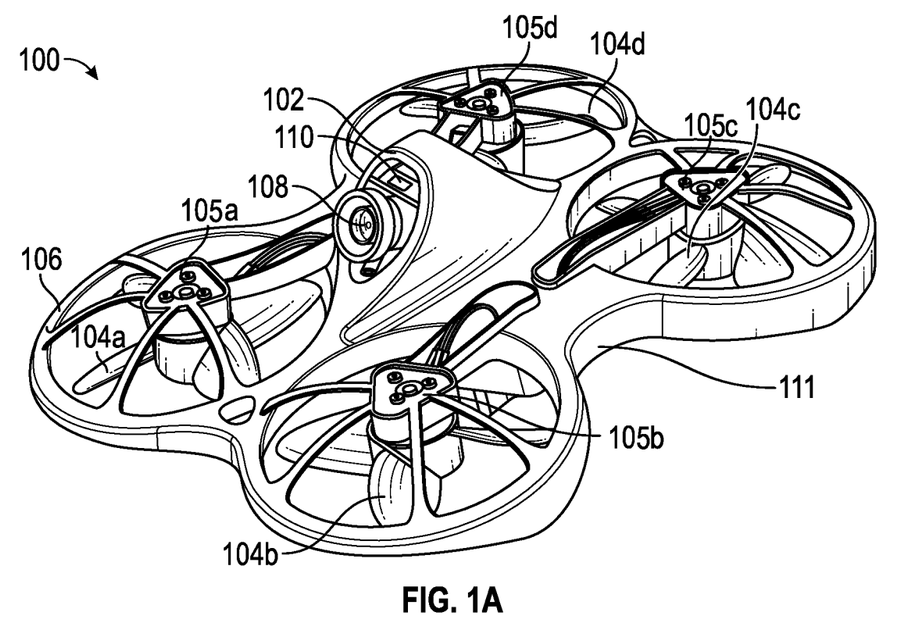
FIG. 1A is a top perspective view of an example UAV having a capacitance sensor for stopping propeller rotation.

FIG. 1A is block diagram of an example UAV 100. The UAV 100 includes housing 102. The housing 102 supports a propeller assembly including one or more propellers 104 (propellers 104a-d in the illustrated examples) and motors 105 (motors 105a-d in the illustrated examples) that turn the propellers 104.

Figure 1B:
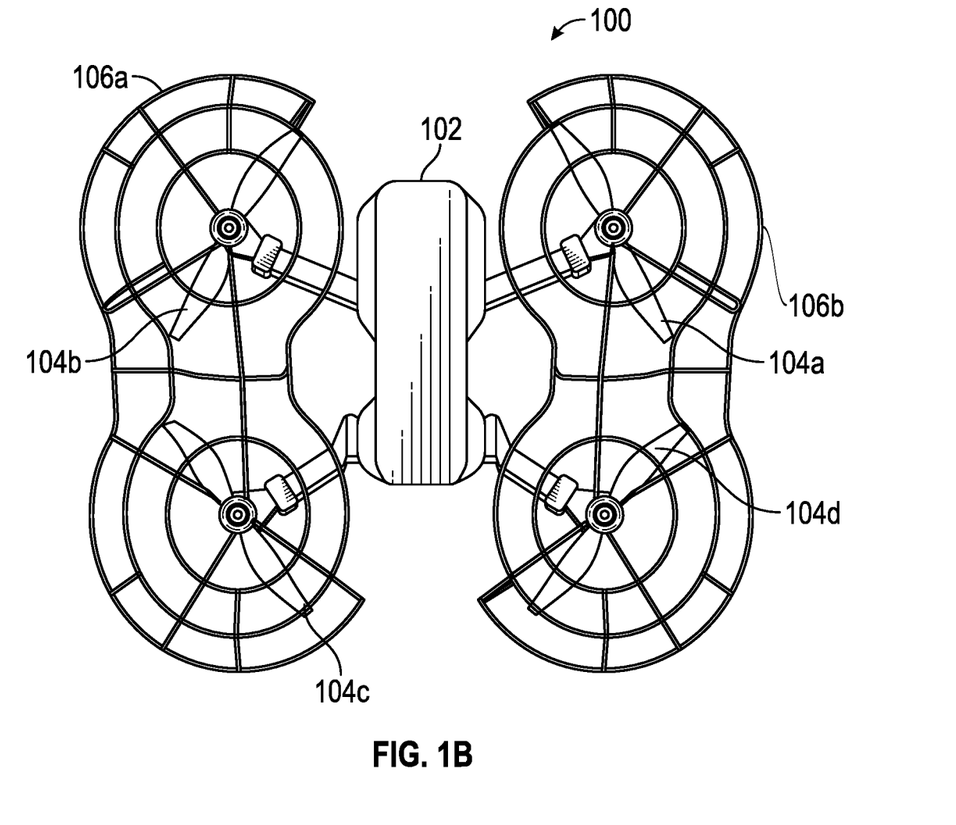
FIG. 1B is a top view of another example UAV having a capacitance sensor for stopping propeller rotation.

The housing 102 includes a main body 111 and a propeller guard 106 at least partially surrounding the propellers 104. The propeller guard 106 may be integrally formed with the main body 111 as illustrated in FIG. 1A or may be distinct from the main body 111 as illustrated in FIG. 1B (which depicts two distinct propeller guards; a first propeller guard 106a at least partially surrounding propellers 104b and 104c and a second propeller guard 106 at least partially surrounding propellers 104a and 104d).

Capacitive sensors, described in further detail below, are attached to or integrated into the exterior surfaces of the housing 102 throughout the main body 111 and propeller guards 106. The exterior of the main body 111 and propeller guards 106 are made from a conductive material such as carbon fiber or aluminum. In one example, substantially all of the exterior surfaces of the housing 102 are conductive such that essentially the entire exterior surface of the housing may be used to form a single conductive sensor. In another example, areas of the exterior surfaces of the housing are defined such that one area on the surface is distinct from other areas of the surface for use in forming multiple conductive sensors (e.g., one conductive sensor for the main body 111 and one or more other conductive sensors for the propellers 104). Defined areas of the housing 102 may be separated from each other by non-conductive materials such as plastic, rubber, or glass.

The illustrated UAV 100 additionally includes a projector 110 and an imager 108. The imager 108 is configured to capture images and the projector 110 is configured to project images onto a projection surface.

Figure 2:
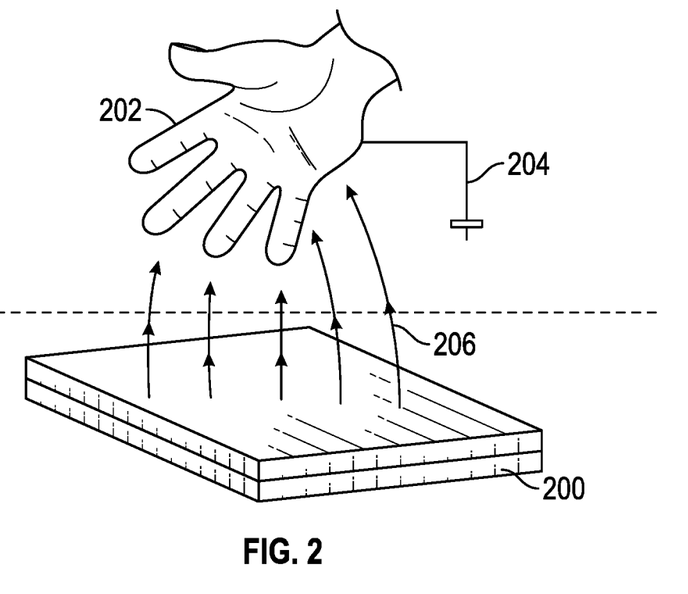
FIG. 2 is an illustration of a human hand near a capacitive sensor of a UAV surface.

FIG. 2 depicts a capacitive sensor 200 for incorporation in the exterior surfaces of the housing 102. The illustrated capacitive sensor 200 is implemented using active sensing in a loading mode. Through capacitive coupling, the sensor is able to detect anything that is conductive or has a dielectric different from air, e.g., fingers of the human body. When a human hand 202 approaches the capacitive sensor, the hand 202 provides a path to ground 204, which changes the electrostatic field 206. The sensor 200 senses the change in the electrostatic field 206 (which is indicative of human touch) and provides a signal for detection by a controller (which acts on the signal by stopping the propellers 104). Although an active sensing capacitive sensor in a loading mode is illustrated, it is contemplated that other types of capacitive sensors may be used.

Figure 3:
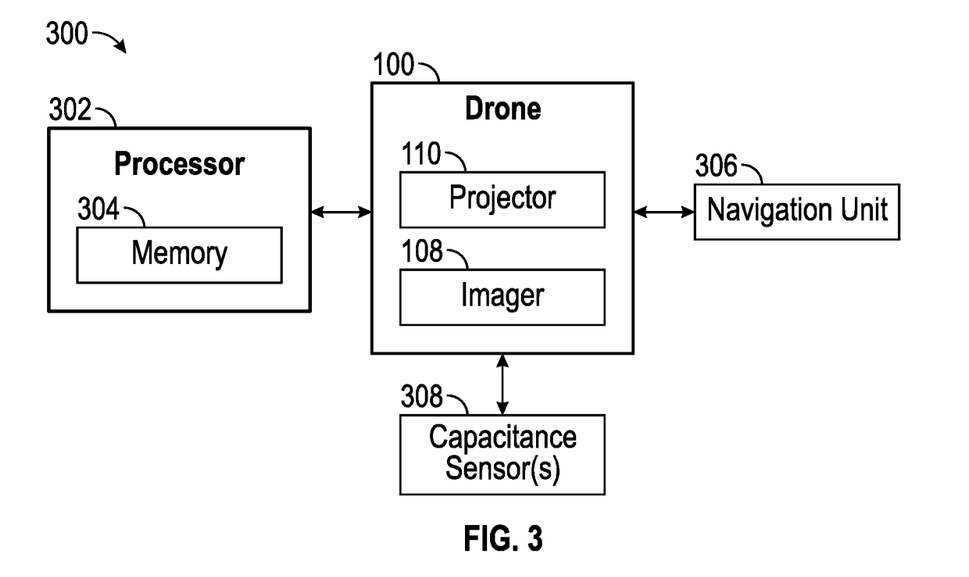
FIG. 3 is a block diagram of an example UAV system with capacitive propeller stoppage.

FIG. 3 depicts components of a safety system 300 including the UAV 100. The UAV 100 (drone in the illustrated example) includes the image 108, the projector 110, and one or more capacitive sensors 308 (e.g., capacitive sensors 200 on the exterior surface of the UAV 100). In one example, where substantially all of the exterior surfaces of the housing 102 are conductive such that essentially the entire exterior surface of the housing may be used to form a single conductive sensor, a single capacitive sensor may be in use. In another example, where areas of the exterior surfaces of the housing 102 are defined, a separate sensor 308 may be coupled to each distinct area (e.g., one conductive sensor 308 for the main body 111 and one or more other conductive sensors 308 for the propellers 104).

The UAV 100 additionally includes a navigation unit 306. The navigation unit 306 is configured to determine a location of the UAV 100. The navigation unit 306 may also determine an orientation of the UAV 100. The orientation may include but is not limited to left, right, center, off-centered, west, east, north south, up, down, degrees thereof, etc. The navigation unit 306 may be a global positioning system (GPS) such as a real time kinematic (RTK) GPS. The RTK GPS may provide a real-time position accuracy of the UAV 100 at a centimeter level. The UAV 100 may support the navigation unit 306 or the navigation unit 306 may be a separate component coupled to the UAV 100.

The UAV 100 also includes a processor 302 and a memory 304 coupled to the UAV 100 and the navigation unit 306. The memory 304 stores instructions for execution by the processor 302 to perform one or more of the functions described herein. The processor 302 is coupled to the memory 304. The processor 302 is configured to perform functions, which are described in further detail below, for stopping the propellers in response to human touch. The UAV 100 support the processor 302 and memory 304.

Figure 4:
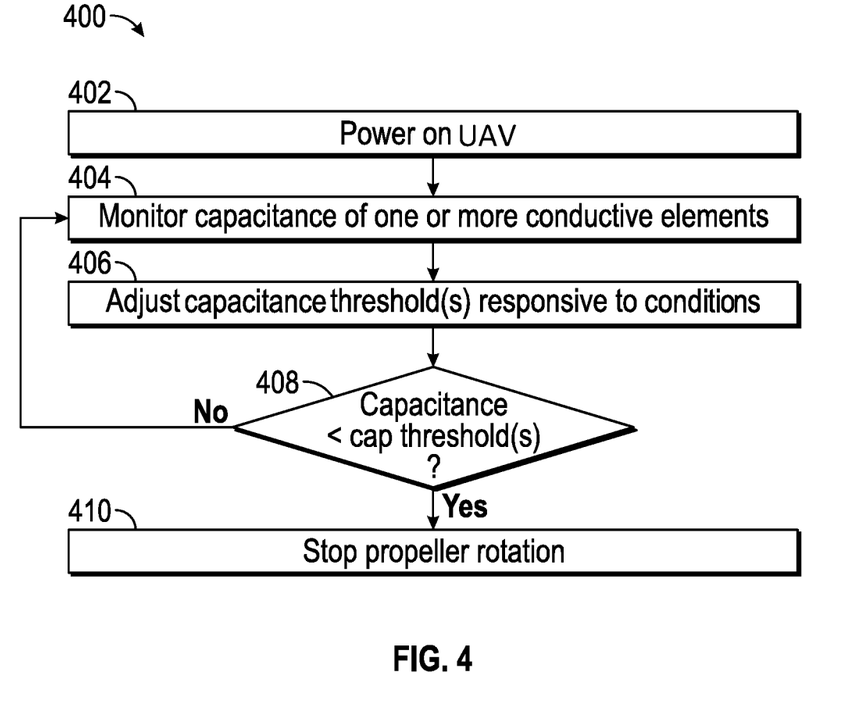
FIG. 4 is a flowchart illustrating an example method for stopping propeller rotation responsive to human touch.

FIG. 4 is flow chart 400 illustrating an example method for stopping the propeller(s) of a UAV 100. In one example, the UAV 100 of FIG. 1 implements the steps of the flow chart 400. One of skill in the art will understand other suitable components for implementing the method of flow chart 400 from the description herein.

At block 402, power on the UAV. The UAV 100 may be powered on by pressing a button (not shown) on an exterior surface of the drone. In one example, powering on the drone initializes a start-up sequence for controlling the drone using computer vision (CV), artificial intelligence, and/or predetermined flight paths stored in memory. In another example, powering on the drone may establish a connection with an external controller for controlling operation of the drone (including an initial start-up sequence in which the propellers are brought up to speed for lift off).

At block 404, monitor capacitance of one or more conductive elements. Processor 302 monitors the capacitance levels received from each of the one or more capacitive sensors 308.

At block 406, adjust capacitance threshold(s) for the capacitive sensors 308 responsive to changing conditions affecting the drone. By way of non-limiting example, the changing conditions may be environmental interference, electromagnetic fields (EMF) generated by the drone's motors, or other factor that may influence capacitance on a conductive surface of the drone. Each capacitive sensor 308 may have a respective threshold that is tuned to detect human touch. Capacitive sensors 308 may be associated with different thresholds depending on their size, shape, and placement (e.g., capacitive sensors 308 adjacent the propeller guards 106 may have a different threshold than those in the main body 111). Capacitance thresholds for different capacitive sensors may be stored in a look-up table in memory 304.

In an example, the processor 302 monitors a current state of the propellers 104, which is indicative of EMF generated by the motors that turn the propellers 104. Because of the high rate of speed at which the motors rotate the propellers 104, the spinning up of the propellers 104 may discharge the one or more capacitive sensors 308 (e.g., the sensor(s) for the propeller guards 105 adjacent the propellers 104). In order to avoid a change in the EMF due to the motors rotating the propellers 104 at a different rate being misinterpreted as a human touch (and cutting power to the propellers 104) the threshold may be adjusted with the changes to the EMF from one or more motors of the propellers 104 such that the resultant change in capacitance does not trigger stoppage of the propellers. Capacitance thresholds for different levels of EMF due to the motors rotating the propellers may be stored in a look-up table in memory 304.

Additionally, the capacitance threshold(s) may be set such that detection is effectively suspended during a start-up sequence during which a user may be holding a UAV 100 prior to launch. Alternatively, the processor 302 may ignore the sensor values during the start-up sequence.

At block 408, compare sensed capacitance levels to thresholds. The processor 302 makes a comparison for each capacitive sensor 308. In one example, if the capacitance level is above the threshold (which is indicative of human touch, processing proceeds at block 404 and the system continues to monitor the capacitance level. In accordance with this example, if the capacitance level falls below the capacitance threshold, processing proceeds at block 410. In another example (not illustrated), if the capacitance level exceeds the capacitance threshold (which is indicative of human touch), processing proceeds at block 410. Multiple sensed capacitance levels may be combined over time to reduce or eliminate the effect of noise (which may cause false readings). For example, capacitance values sensed over the last 250 milliseconds may be averaged to reduce or eliminated noise that could lead to false readings.

At block 410, the propeller rotation is stopped. The processor 302 stops the propellers 104 responsive to one of the capacitive sensors 308 crossing its respective threshold. The processor 302 may stop propeller rotation by actively slowing the propellers with the motor(s) 105 of the propeller assembly(ies) or may cut power to the motor(s), e.g., via an electro mechanical switch positioned in a power supply line for the motor(s) 105.

Figure 5:
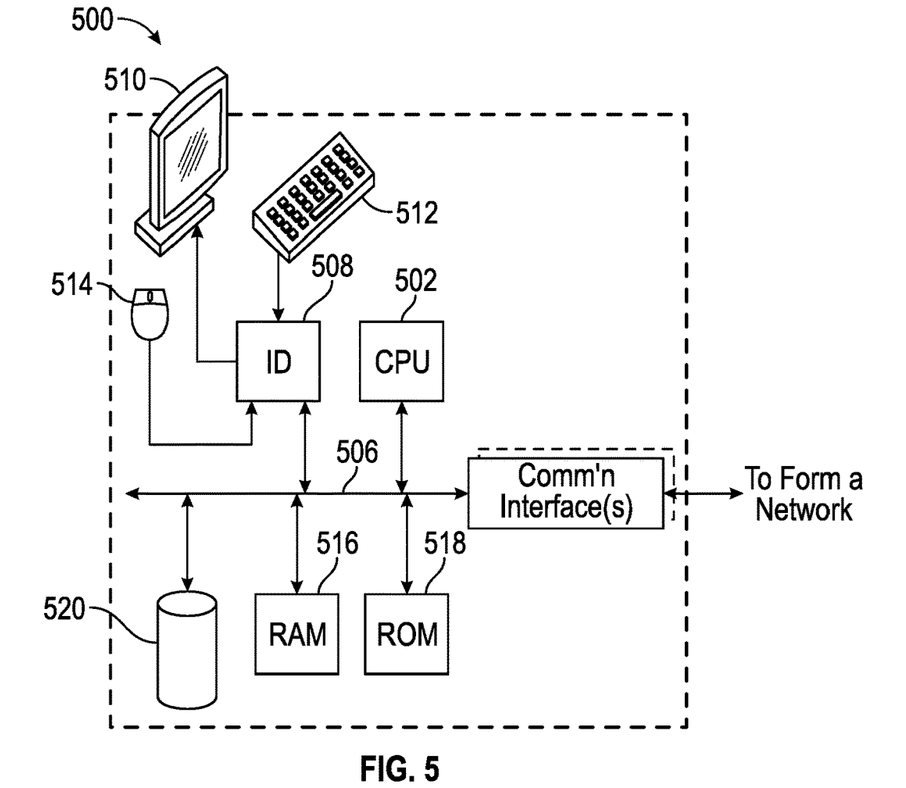
FIG. 5 is a functional block diagram illustrating a general-purpose computer hardware platform configured to implement the functional examples described with respect to FIGS. 1-4.
Figure 6:
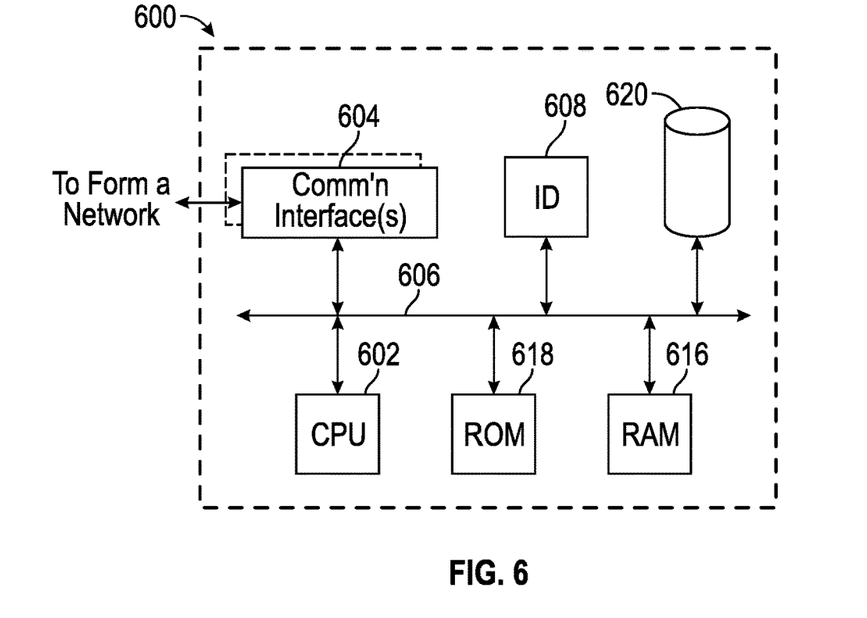
FIG. 6 is another functional block diagram illustrating a general-purpose computer hardware platform configured to implement the functional examples described with respect to FIGS. 1-4.

Aspects of the methods for stopping propeller rotation, as outlined above, may be embodied in programming in general purpose computer hardware platforms 500 and 600 (such as described above with respect to FIG. 4), e.g., in the form of software, firmware, or microcode executable by a networked computer system such as a server or gateway, and/or a programmable nodal device.

In one example, program aspects of the technology are "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may communicate through the Internet or various other telecommunication networks. Such communications, for example, may enable loading of the software, from one computer or processor (e.g., CPU 502 and CPU 602 of FIGS. 5 and 6, respectively) into another, for example, from a processor 104a-104n of the UAV 100 to a computer or software of another system (not shown). Thus, another type of media that may bear the software elements includes optical, electrical and electromagnetic waves, such as used across physical communication interface(s) 504 and 604 of FIGS. 5 and 6, respectively, between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a machine or computer platform. Tangible transmission media include coaxial cables; copper wire and fiber optics, including the wires that include a bus (e.g., 506 and 606 of FIGS. 5 and 6 respectively) within a computer system that communicates to other components of the computer system via an input/output (I/O) 508 and 608 of FIGS. 5 and 6, respectively. Carrier-wave transmission media can take the form of electric or electromagnetic signals, or acoustic or light waves such as those generated during radio frequency (RF) and light-based data communications. In one example, as shown in FIG. 5, the computer system includes a video display unit 510, (e.g., a liquid crystal display (LCD) or a cathode ray tube (CRT)), an alphanumeric input device 512 (e.g., a keyboard), a cursor control device 514 (e.g., a mouse), each of which communicate via the I/O 508.

Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM (e.g., 516 and 616 of FIGS. 5 and 6 respectively), a ROM (e.g., 518 and 618 of FIGS. 5 and 6 respectively), hard disk drive (e.g., 520 and 620 of FIGS. 5 and 6 respectively) a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may include a software or firmware implementation encoded in any desired language. Programming instructions, when embodied in machine-readable medium accessible to a processor of a computer system or device, render computer system or device into a customized special-purpose machine to perform the operations specified in the program performed by processor 302 of the UAV 100.

While the foregoing has described are considered the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They intend to have a reasonable range that is consistent with the functions to which they relate and with what is ordinary in the art to which they pertain.

The scope of protection limits solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 105 of the Patent Act, nor should they be interpreted in such a way. Any unintended embracement of such subject matter is hereby disclaimed.

Except as stated immediately above, nothing that has been stated or illustrated is intended or interpreted to cause a dedication of any component, step, feature, object, benefit, advantage, or equivalent to the public, regardless of whether it is or is not recited in the claims.

It understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

In addition, in the foregoing Detailed Description, it is seen that various features are grouped together in various examples to streamline the disclosure. This method of disclosure does not reflect an intention that the claimed examples require more features than are expressly recited in each claim. Rather, as the following claims reflect, the subject matter of the claims lies in less than all features of any single disclosed example. Thus, the following claims are hereby incorporated into the Detailed Description, with each claim standing on its own as a separately claimed subject matter.

While the foregoing describes what is considered to be the best mode and other examples, it is understood that various modifications may be made and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An unmanned aerial vehicle (UAV) comprising:
a propeller assembly including a propeller and a motor that turns the propeller, the propeller having rotation states including a first rotation state indicative of a first electromagnetic field and a second rotation state indicative of a second electromagnetic field;
a housing supporting the propeller assembly, the housing including an exterior conductive surface;
a capacitive sensor coupled to the exterior conductive surface, the capacitive sensor configured to sense a capacitance; and
a controller coupled to the propeller assembly and to the capacitive sensor coupled to the exterior conductive surface, the controller configured to monitor the rotation states of the propeller, set a capacitance threshold indicative of human touch on the exterior conductive surface to a first threshold when the propeller is in the first rotation state and to a second threshold when the propeller is in the second rotation state, detect the capacitance sensed by the capacitive sensor on the exterior conductive surface crossing the capacitance threshold set by the controller, and stop rotation of the propeller in response to the detected capacitance crossing the capacitance threshold indicative of human touch on the exterior conductive surface set by the controller in response to the rotation states of the propeller only after an initial start-up sequence in which the propeller is brought up to speed for lift off.

2. The UAV of claim 1, wherein the housing further includes an other exterior conductive surface and wherein the UAV further comprises:
an other capacitive sensor coupled to the other exterior conductive surface, the other capacitive sensor configured to sense an other capacitance indicative of human touch;
wherein controller is further coupled to the other capacitive sensor and is further configured to detect the other capacitance indicative of human touch and to stop rotation of the propeller in response to the sensed other capacitance.

3. The UAV of claim 2, wherein the housing includes a main body and a propeller guard attached to the main body and at least partially surrounding the propeller; and
wherein the capacitive sensor is coupled to the main body and the other capacitive sensor is coupled to the propeller guard.

4. The UAV of claim 3, wherein the capacitance indicative of human touch has a first threshold and the other capacitance indicative of human touch has a second threshold.

5. The UAV of claim 1, wherein the first rotation state is a spinning up state associated with the first electromagnetic field and the second rotation state is an operating state associated with the second electromagnetic field.

6. The UAV of claim 1, wherein the housing includes a main body and a propeller guard attached to the main body and at least partially surrounding the propeller; and
wherein the capacitive sensor is coupled to the propeller guard.

7. The UAV of claim 6, wherein the controller is configured to detect the capacitance only after the initial start-up sequence.

8. The UAV of claim 1, further comprising:
an other propeller assembly including an other propeller;
wherein the controller is further coupled to the other propeller assembly and is further configured to stop rotation of the other propeller in response to the detected capacitance.

9. The UAV of claim 8, wherein the housing includes a main body, a first propeller guard attached to the main body and at least partially surrounding the propeller, and a second propeller guard attached to the main body and at least partially surrounding the other propeller.

10. The UAV of claim 1, wherein the housing includes a main body and a propeller guard attached to the main body, the propeller guard at least partially surrounding the propeller.

11. A safety method for an unmanned aerial vehicle (UAV), the UAV having an exterior conductive surface and a propeller, the method comprising:
monitoring rotation states of a propeller being turned by a motor, the rotation states including a first rotation state indicative of a first electromagnetic field and a second rotation state indicative of a second electromagnetic field;
setting a capacitance threshold indicative of human touch on the exterior conductive surface to a first threshold when the propeller is in the first rotation state and to a second threshold when the propeller is in the second rotation state;

sensing capacitance on the exterior conductive surface of the UAV;

detecting the capacitance sensed by a capacitive sensor on the exterior conductive surface crossing the set capacitance threshold; and stopping rotation of the propeller of the UAV responsive to the detected capacitance crossing the set capacitance threshold indicative of human touch on the exterior conductive surface in response to the rotation states of the propeller only after an initial start-up sequence in which the propeller is brought up to speed for lift off.

12. The method of claim 11, wherein the stopping rotation of the propeller responsive to the sensed capacitance is only performed after the initial start-up sequence.

13. The method of claim 11, wherein the sensing comprises:

sensing capacitance indicative of human touch in a first area on the exterior conductive surface of the UAV; and sensing capacitance indicative of human touch in a second area on the exterior conductive surface of the UAV.

14. The method of claim 11, wherein the first rotation state is a spinning up state associated with the first electromagnetic field and the second rotation state is an other spinning operating state associated with the second electromagnetic field.

15. A non-transitory computer readable medium for use with an unmanned aerial vehicle (UAV), the UAV having an exterior conductive surface, a propeller, and a controller, the non-transitory computer readable medium having stored thereon a program, wherein execution of the program of the non-transitory computer readable medium by the controller configures the UAV to:

monitor rotation states of a propeller being turned by a motor, the rotation states including a first rotation state indicative of a first electromagnetic field and a second rotation state indicative of a second electromagnetic field;

set a capacitance threshold indicative of human touch on the exterior conductive surface to a first threshold when the propeller is in the first rotation state and to a second threshold when the propeller is in the second rotation state;

sense capacitance indicative of human touch on the exterior conductive surface of the UAV; and detect the capacitance sensed by a capacitive sensor on the exterior conductive surface crossing the capacitance threshold set by the controller; and stop rotation of the propeller of the UAV responsive to the detected capacitance crossing the capacitance threshold indicative of human touch on the exterior conductive surface set by the controller in response to the rotation states of the propeller only after an initial start-up sequence in which the propeller is brought up to speed for lift off.

16. The non-transitory computer readable medium of claim 15, wherein to sense capacitance the controller is configured to:

sense capacitance indicative of human touch in a first area on the exterior conductive surface of the UAV; and sense capacitance indicative of human touch in a second area on the exterior conductive surface of the UAV.

17. The non-transitory computer readable medium of claim 15, wherein the first rotation state is a spinning up state associated with the first electromagnetic field and the second rotation state is an other rotating state associated with the second electromagnetic field.

* * * * *